(12) United States Patent
Troncoso Pastoriza et al.

(10) Patent No.: US 8,433,925 B2
(45) Date of Patent: Apr. 30, 2013

(54) CRYPTOGRAPHIC SYSTEM FOR PERFORMING SECURE COMPUTATIONS AND SIGNAL PROCESSING DIRECTLY ON ENCRYPTED DATA IN UNTRUSTED ENVIRONMENTS

(75) Inventors: Juan Ramon Troncoso Pastoriza, Vigo (ES); Pedro Comesana Alfaro, Vigo (ES); Fernando Perez Gonzalez, Vigo (ES)

(73) Assignee: Gradiant, Vigo (ES)

( * ) Notice: Subject to any disclaimer, the term of this patent is extended or adjusted under 35 U.S.C. 154(b) by 198 days.

(21) Appl. No.: 12/876,223

(22) Filed: Sep. 6, 2010

(65) Prior Publication Data

US 2011/0060917 A1    Mar. 10, 2011

Related U.S. Application Data

(60) Provisional application No. 61/240,177, filed on Sep. 4, 2009.

(51) Int. Cl.
    *G06F 21/00* (2006.01)
(52) U.S. Cl.
    USPC .......................................... 713/189; 713/150
(58) Field of Classification Search ....... 380/1; 713/189
    See application file for complete search history.

(56) References Cited

U.S. PATENT DOCUMENTS

| | | | |
|---|---|---|---|
| 7,526,084 B2 * | 4/2009 | Smaragdis et al. | 380/28 |
| 8,161,463 B2 * | 4/2012 | Johnson et al. | 717/136 |
| 2007/0116283 A1 * | 5/2007 | Tuyls et al. | 380/255 |
| 2010/0106964 A1 * | 4/2010 | Hirata et al. | 713/155 |
| 2011/0110525 A1 * | 5/2011 | Gentry | 380/285 |
| 2012/0039463 A1 * | 2/2012 | Gentry et al. | 380/28 |

OTHER PUBLICATIONS

Craig Gentry. 2009. Fully homomorphic encryption using ideal lattices. In Proceedings of the 41st annual ACM symposium on Theory of computing (STOC '09). ACM, New York, NY, USA, 169-178. DOI=10.1145/1536414.1536440.*

Communication Efficient Secure Linear Algebra. Kobbi Nissim and Enav Weinreb. Theory of Cryptography. Lecture Notes in Computer Science, 2006, vol. 3876/2006, 522-541, DOI: 10.1007/11681878_27.*

(Continued)

*Primary Examiner* — Yin-Chen Shaw
*Assistant Examiner* — James Turchen
(74) *Attorney, Agent, or Firm* — Mateo Aboy; Aboy & Associates PC

(57) ABSTRACT

Disclosed embodiments include a cryptographic system implemented in at least one digital computer with one or more processors or hardware such as FPGAs for performing secure computations, analysis, and signal processing directly on encrypted data in untrusted environments. According to a basic embodiment, the proposed cryptographic system comprises: (a) at least one secure protocol for performing matrix multiplications in the encrypted domain, and (b) at least one secure protocol for solving systems of linear equations in the encrypted domain. According to a particular embodiment, the system comprises a plurality of privacy-preserving protocols for solving systems of linear equations (SLE) directly based on homomorphic computation and secret sharing. More specifically, according to a particular embodiment, the system uses a protocol whereby systems of linear equations are solved securely by direct Gaussian elimination using a secure protocol without imposing any restrictions on the matrix coefficients.

5 Claims, 3 Drawing Sheets

OTHER PUBLICATIONS

A Simple Publicly Verifiable Secret Sharing Scheme and Its Application to Electronic Voting. Berry Schoenmakers. Advances in Cryptology—CRYPTO' 99. Lecture Notes in Computer Science, 1999, vol. 1666/1999, 784, DOI: 10.1007/3-540-48405-1_10.*

Troncoso-Pastoriza et al. (Juan Ramón Troncoso-Pastoriza, Pedro Comesaña, and Fernando Pérez-González). Secure Direct and Iterative Protocols for Solving Systems of Linear Equations. In SPEED Workshop 2009, pp. 122-141, Lausanne, Switzerland, Sep. 2009.

Bianchi et al. (Bianchi, T., Piva, A., Barni, M.): On the implementation of the discrete Fourier transform in the encrypted domain. IEEE Transactions on Information Forensics and Security 4(1) (2009) 86-97.

Cramer et al. (Cramer, R., Damgard I.): Secure distributed linear algebra in a constant number of rounds. In: 21st Annual International Cryptology Conference on Advances in Cryptology. vol. 2139 of Lecture Notes in Computer Science., Springer (2001) 119-136.

Due et al. (Du, W., Atallah, M.J.): Privacy-preserving cooperative scientific computations. In: Proceedings of the 14th IEEE Computer Security Foundations Workshop, Nova Scotia, Canada (Jun. 2001) 273-282.

Goethals et al. (Goethals, B., Laur, S., Lipmaa, H., Mielikainen, T.): On private scalar product computation for privacy-preserving data mining. In Park, C., Chee, S., eds.: 7th Annual International Conference in Information Security and Cryptology (ICISC 2004). vol. 3506 of Lecture Notes in Computer Science., Seoul, Korea, Springer (Dec. 2004) 104-120.

* cited by examiner

CRYPTOGRAPHIC SYSTEM FOR PERFORMING SECURE COMPUTATIONS AND SIGNAL PROCESSING DIRECTLY ON ENCRYPTED DATA IN UNTRUSTED ENVIRONMENTS

CROSS-REFERENCE TO RELATED APPLICATIONS

This application claims the benefit of U.S. Provisional Application No. 61/240,177 filed on 2009 Sep. 4 by the present inventors, which is incorporated herein by reference.

TECHNICAL FIELD

Disclosed embodiments relate to cryptography methods and systems. Specifically, they relate to cryptosystems for the execution of operations directly on encrypted data.

BACKGROUND

In modern society, digital data about individuals can be found relatively easily in the communication networks, especially the Internet. Although the public supports the last decades' advances in digital networks, the sensitive nature of this data motivates the raise of an increasing concern about the public availability of personal data, and the processing performed on it. For instance, in Europe this concern has been reflected in a series of Directives, dealing with the protection of individuals' personal data. Directive 95/46/EC deals with the protection of individuals with regard to the processing of personal data and the free movement of such data, where personal data means any information relating to an identified or identifiable natural person. One of the main ideas of this Directive is that data processing systems must respect the fundamental rights and freedoms, especially the right to privacy. Similar laws and directives regarding informational privacy have been proposed in the US and other developed countries. These include Internet privacy, medical privacy, financial privacy, law enforcement privacy, and political privacy.

There are currently numerous methods available to provide security to a database containing data intended to be held private to third parties. This problem is solved by methods of secure authentication. These methods are widely used to protect the security of databases containing medical, financial, and other types of data. An additional level of security can be added by encrypting all the data contained within the secure database and transmitted to and from the secure database during uploading or downloading operations. This is especially useful when data must be transmitted over a potentially unsecure medium such as computer networks. However, even in these increased security systems at some point the encrypted data is decrypted by an authorized user to perform the necessary data analysis tasks. For instance, in the case of medical research the secure clinical data management system containing the encrypted clinical data and physiological time-series corresponding to a particular study, research, or clinical trial requires the authorized researcher to decrypt the data in order to perform the needed mathematical analysis, signal processing, and statistical analysis in order to generate the study results. There are situations where this conventional framework does not meet the security requirements, that is, in order to analyze and process the encrypted data, such data should not be first decrypted (i.e. the data should be kept encrypted at all times). There are situations where data should be completely private even to researchers, clinical administrators, and system administrators. This may be due to purely privacy reasons or due to research considerations. For instance, certain studies may require scientists and researchers to be completely blinded and the hypothesis and analysis methods to be chosen a-priori. In order to accomplish this, methods for performing the typical mathematical operations and computations including statistical analysis techniques, algebraic methods, signal processing methods, and other computation operations directly on the encrypted datasets are needed. Currently, the availability of such secure methods and cryptosystems is limited.

Conventional cryptographic protocols deal with the problem of protecting some private information from an unauthorized third party that otherwise could modify or have access to the information. In the scenario of secure processing, where the privacy must be preserved not only against an unauthorized third party, but also against the parties that process the data, there are no available systems or methods that can be used in real-world scenarios in terms of both computational cost and communication complexity.

Up to now, the efficient protocols presented in the field of signal processing in the encrypted domain have been focused on linear operations, like scalar products, and non-iterative algorithms. Nevertheless, there are many basic algorithms needed for most signal processing applications that are iterative and involve not only scalar products with known values, but also products between two a-priori unknown sequences. The lack of these algorithms would suppose missing a powerful and irreplaceable tool that enables almost any signal processing application and most types of analysis methods.

Currently there is no practical fully homomorphic cryptosystem, that is, there is no secure cryptosystem that allows for the homomorphic computation of additions and products without restrictions. There has been a recent contribution by Gentry that presents a cryptosystem based on ideal lattices with bootstrappable decryption, and it has been shown that it achieves a full homomorphism. Nevertheless, the authors of this method concede that making the scheme practical remains an open problem.

At the moment there are no cryptosystems available that are capable of performing computations such as solving systems of linear equations without imposing any restrictions on the matrix coefficients. These cryptosystems are a critical building block needed to develop and implement more complex cryptosystems capable of performing advanced signal processing, computation, and analysis directly on encrypted data.

SUMMARY

According to one embodiment, the proposed system involves a cryptographic system (i.e. a cryptosystem) for the execution of operations directly on encrypted data, that is, a system designed to address the problem of efficiently processing signals in untrusted environments, where not only the communication channel between parties is unsecure, but also the parties that perform the computation cannot be trusted.

Disclosed embodiments include a cryptographic system implemented in at least one digital computer with one or more processors or hardware such as FPGAs for performing secure computations, analysis, and signal processing directly on encrypted data in untrusted environments. According to a basic embodiment, the proposed cryptographic system comprises: (a) at least one secure protocol for performing matrix multiplications in the encrypted domain, and (b) at least one secure protocol for solving systems of linear equations in the encrypted domain. According to a particular embodiment, and without limitation, the system comprises a plurality of privacy-preserving protocols for solving systems of linear equations (SLE) directly based on homomorphic computation and secret sharing. More specifically, according to a particular embodiment, and without limitation, the system uses a protocol whereby systems of linear equations are solved securely by direct Gaussian elimination using a secure protocol without imposing any restrictions on the matrix coefficients.

BRIEF DESCRIPTION OF THE DRAWINGS

Disclosed embodiments are illustrated by way of example, and not by way of limitation, in the figures of the accompanying drawings.

DETAILED DESCRIPTION

Figure 1:
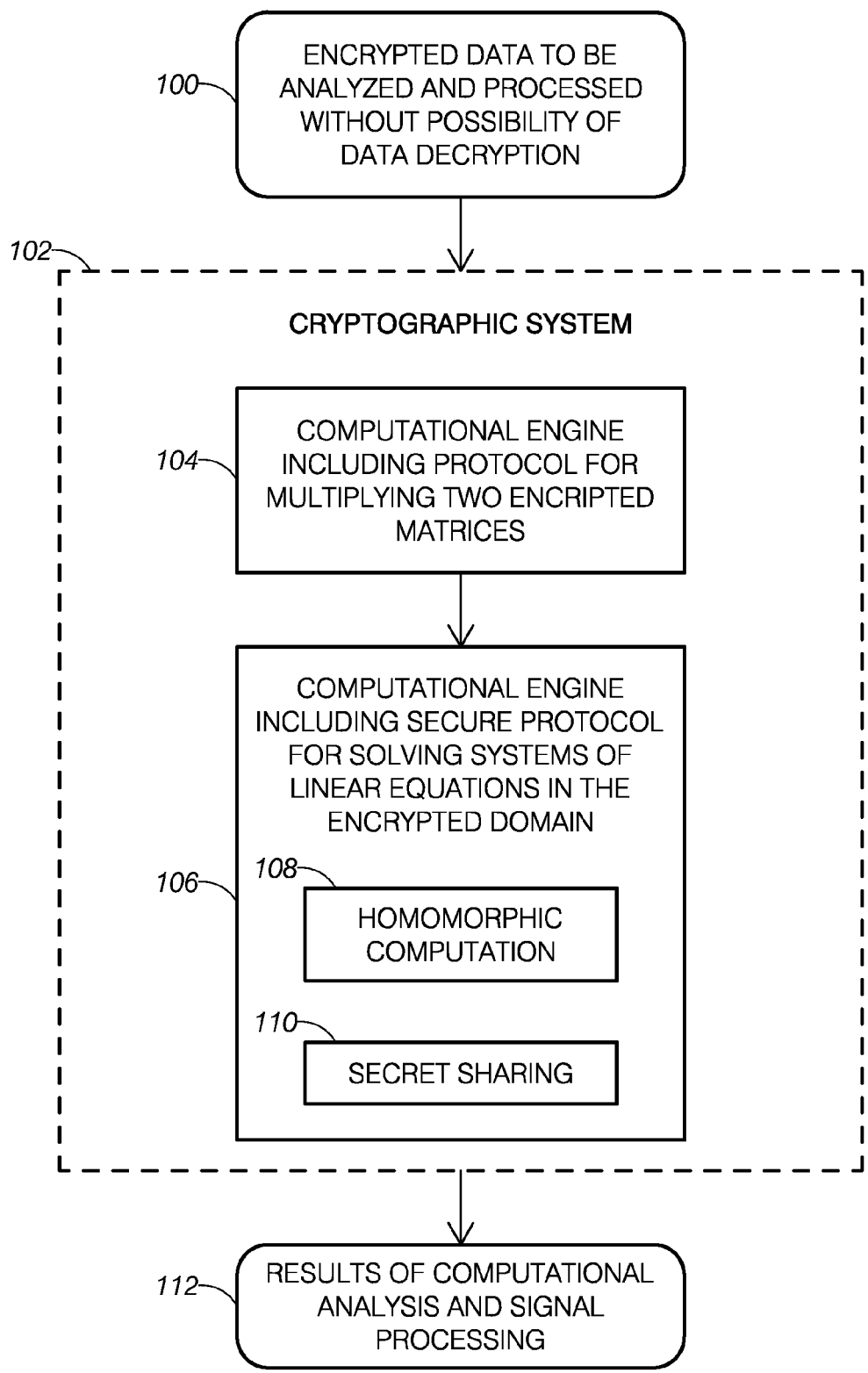
FIG. 1 shows a block diagram to illustrate the cryptographic system according to one embodiment.

FIG. 1 shows a block diagram of the cryptographic system 102 according to one embodiment. The embodiments disclosed describe how to realize a cryptographic system 102 for performing secure mathematical computations, signal processing, statistical signal processing, statistics, and data analysis directly on encrypted data 100 in untrusted environments. According to one embodiment, the system involves a cryptosystem 102 for the execution of operations directly on encrypted data 100, that is, a system designed to address the problem of efficiently processing signals in untrusted environments, where not only the communication channel between parties is unsecure, but also the parties that perform the computation cannot be trusted.

Certain specific details are set forth in the following description and figures to provide a thorough understanding of various embodiments disclosed. Certain well-known details often associated with computing and software technology are not set forth in the following disclosure to avoid unnecessarily obscuring the various disclosed embodiments. Further, those of ordinary skill in the relevant art will understand that they can practice other embodiments without one or more of the details described below. Aspects of the disclosed embodiments may be implemented in the general context of computer-executable instructions, such as program modules, being executed by a computer, computer server, or device containing a processor. Generally, program modules include routines, programs, objects, components, data structures, etc. that perform particular tasks or implement particular abstract data types. Aspects of the disclosed embodiments may also be practiced in distributed computing environments where tasks are performed by remote processing devices that are linked through a communications network. In a distributed computing environment, program modules may be located in both local and remote storage media including memory storage devices. Those skilled in the art will appreciate that, given the description of the modules comprising the disclosed embodiments provided in this specification, it is a routine matter to provide working systems which will work on a variety of known and commonly available technologies capable of incorporating the features described herein.

According to a disclosed embodiment, the cryptographic system 102 is implemented in a digital computer with one or more processors for performing secure computations and signal processing directly on encrypted data 100 in untrusted environments, said cryptographic system 102 comprises: (a) at least one secure protocol for performing matrix multiplications in the encrypted domain 104, and (b) at least one secure protocol for solving systems of linear equations in the encrypted domain 106. According to a particular embodiment, and without limitation, the system uses a protocol whereby systems of linear equations are solved securely by direct Gaussian elimination using a secure multiplication protocol to directly generate the results 112 of such secure mathematical computations, signal processing, statistical signal processing, statistics, and data analysis directly on encrypted data 100 in untrusted environments. According to other embodiments the disclosed cryptosystem can be implemented in other hardware besides a digital computer including microcontrollers, DSPs, FPGAs or ASICs, as well as in firmware and software.

The disclosed embodiments of the cryptosystem 102 and associated secure protocols have specific and substantial utility by themselves as systems and methods for cryptography and secure (encrypted) computation but also in a variety of practical applications in diverse fields including secure clinical data management systems, secure web-enabled platforms for collaboration involving privacy data, secure law enforcement systems, secure financial systems, and secure military systems involving transmission of encrypted data to be processed in real-time without decryption.

According to a basic embodiment, the proposed cryptographic system 102 comprises: (a) at least one secure protocol for performing matrix multiplications in the encrypted domain 104, and (b) at least one secure protocol for solving systems of linear equations in the encrypted domain 106 whereby systems of linear equations are solved securely by direct Gaussian elimination using a secure multiplication protocol based on homomorphic computation 108 and secret sharing 110 without placing any restrictions on the nature of the matrix coefficients (i.e. the matrix coefficients can be real numbers or complex numbers).

By way of example, and not by way of limitation, the embodiments of the disclosed cryptosystem 102 can be used to perform direct analysis and processing in encrypted clinical, financial, national security, military, law enforcement, and political data without the need to decrypt said data prior to performing said analysis and processing. For instance, according to one embodiment the disclosed cryptosystem 102 can be used to realize and implement a secure clinical system wherein all patient data, clinical history, clinical data, physiologic data and time series, biochemical data, and drug therapy data are encrypted at all times for secure transmission, management, and collaboration among researchers and clinicians; and all operations, processing, and statistical analysis performed on such data is conducted on the encrypted domain (i.e. with the data encrypted at all times). A specific particular embodiment of such secure clinical data management and analysis system comprises (a) at least one secure protocol for performing matrix multiplications in the encrypted domain 104, and (b) at least one secure protocol for solving systems of linear equations in the encrypted domain 106 in addition to the well-known elements comprising clinical management systems. According to a more specific embodiment, such protocol for solving systems of linear equations in said secure clinical data management system is based on a direct implementation of Gaussian elimination using a secure protocol.

Figure 2:
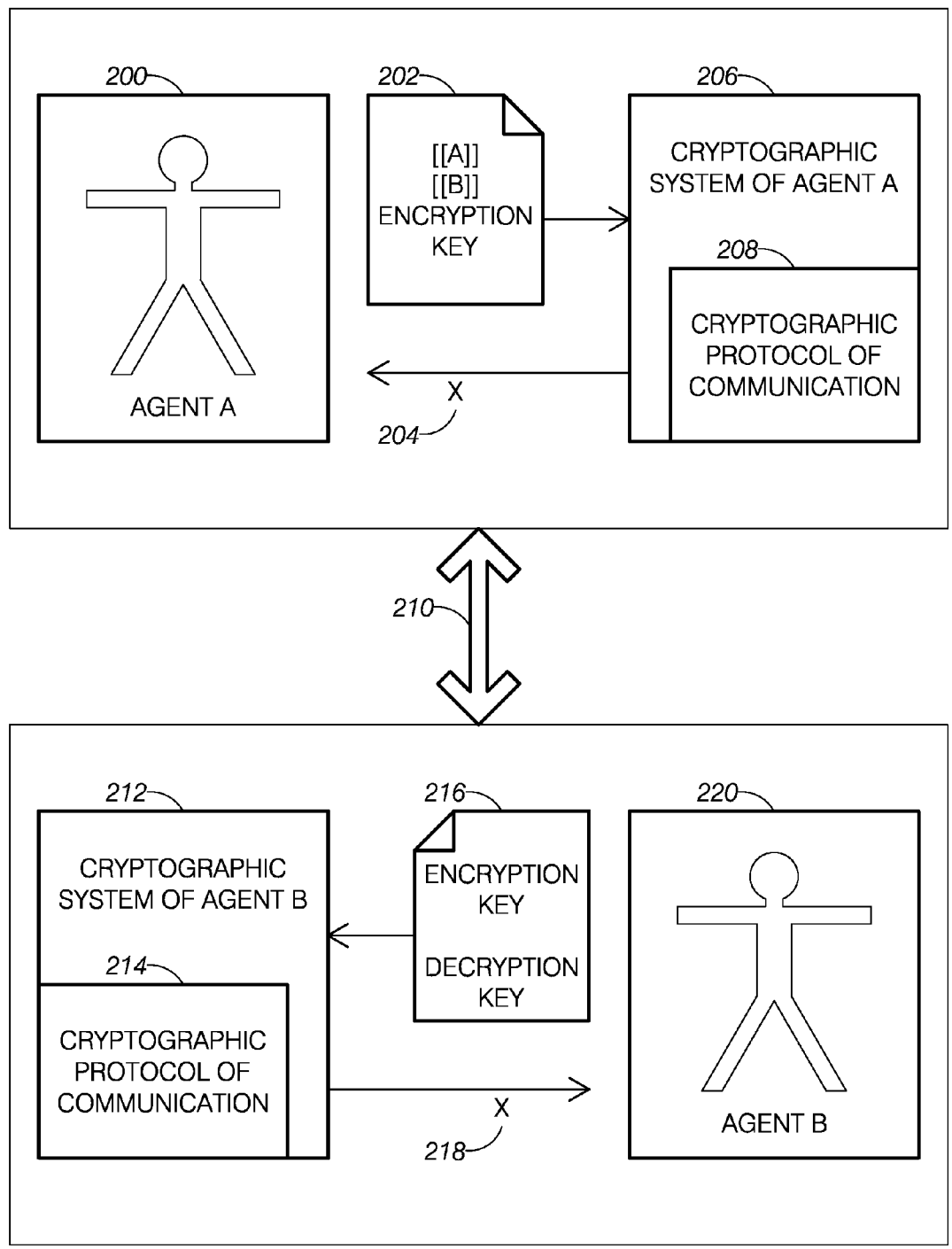
FIG. 2 shows a high level block diagram to illustrate the operation of the cryptographic system.

FIG. 2 shows a high level diagram to illustrate the operation of the cryptographic system according to one embodiment. In the embodiment illustrated, and without limitation, there are two parties $\mathcal{A}$ 200 and $\mathcal{B}$ 220. The first party owns an encrypted matrix [[A]] and an encrypted vector [[b]], as well as the key for producing encryptions using a homomorphic encryption 202. The party $\mathcal{B}$ owns both the encryption and decryption key 216 for the same homomorphic encryption. The cryptographic system is used at both ends 206 and 212 in order to privately solve the linear system of equations A·x=b. This cryptographic system comprises a protocol of communication between both ends 208 and 214 that defines the operations performed and the format of the interchanged numbers in order to interactively solve the system without disclosing any information. This communication takes place over any communication channel 210 (e.g., a wired or wireless medium or a sole device). After the execution of the protocol, the system outputs the solution x 204 and 218 to the linear system of equations A·x=b. It is important to note that both $\mathcal{A}$ and $\mathcal{B}$ can represent a plurality of parties or entities (not necessarily a single entity).

Secure matrix multiplication (linear transformations) and solving linear systems of equations in the encrypted domain are fundamental mathematical building blocks to solve a great variety of problems involving data analysis, time-series analysis, digital signal processing, statistical signal processing, optimal filtering, adaptive filtering, digital communications, coding, encryption, information theory, and any other problem involving the least squares framework and representation of signals in vector spaces.

While particular embodiments are described, it is understood that, after learning the teachings contained in this disclosure, modifications and generalizations will be apparent to those skilled in the art without departing from the spirit of the disclosed embodiments.

A. Mathematical Notation.

In the detailed description the following mathematical notation is used. The mathematical notation is thoroughly described in this section to aid those skilled in the art to understand, implement, and practice the disclosed embodiments.

In the description we use indistinctly lowercase letters to represent classes in a ring $(\mathbb{Z}_n, +, \cdot)$ and a representative of that class in the interval [0, n). $\lceil \cdot \rfloor$ represents the rounding function of a number to the nearest integer.

The used vectors have size L and are represented by lowercase boldface letters, whereas matrices are represented by upper-case boldface letters. $\mathbf{A'}=\{a_{i,j}\}_{r,s}^{t,u}$ represents the submatrix of A of size (t−r+1)×(u−s+1), defined by $a'_{i,j}=a_{i+r-1, j+s-1}$.

The encryption of a number x is represented by [[x]], and the vector (matrix) formed by the encryptions of the vector x (matrix X) is represented by [[x]] ([[X]]).

The operations performed between encrypted and clear numbers are indicated as if they were performed in the clear; e.g. [[X]]·b represents the encryption of [[X·b]].

Regarding the complexity calculations, the complexity of basic modular operations, like additions (A), products (P) and exponentiations (X) is denoted by $\text{Comp}_A$, $\text{Comp}_P$, $\text{Comp}_X$ respectively, prefixing an E (i.e. EA, EP, EX) when they are performed under encryption. The factor ct<1 denotes the ratio between the size of a clear-text value and that of an encrypted value. Finally, the subscript cm denotes communication complexity, measured in number of sent encryptions, while cp indicates computational complexity, with an indication of the party whose complexity is represented.

B. Techniques Employed According to One Embodiment.

According to one embodiment, the cryptographic system 102 uses secure multiparty computation techniques including homomorphic encryption and secret sharing.

According to one embodiment the cryptographic system 102 makes use of homomorphisms between the groups of clear-text and cipher-text, that allow for the execution of a given operation directly on encrypted values, without the need for decryption. This includes homomorphic RSA cryptosystem, with a multiplicative homomorphism, or Paillier with an additive homomorphism. The methods implemented are not restricted to the use of cryptosystem for the presented protocols, as far as it presents an additive homomorphism. In this embodiment the system 102 uses an extension of Paillier encryption in its threshold and non-threshold form; that is, a k out of M threshold public key encryption system is a cryptosystem where the private key is distributed among M parties, and at least k of them are needed for decryption.

According to one embodiment the cryptographic system 102 makes use of secret sharing. In this embodiment a given value (the secret) is divided among several parties, such that the cooperation among a number of these parties is needed in order to recover the secret. None of the parties alone can have access to the secret. According to one embodiment the scheme is based on polynomials, and the need of k points in order to completely determine a degree (k−1) polynomial. The disclosed embodiment uses secret sharing for two-party protocols based on linear functions, without limitation, since each party can represent a plurality of entities. According to one embodiment, the system supports the computation of sums and products directly on the shares as follows: 1) let $\mathbb{Z}_n$ be the domain of the secrets; 2) then, a share of a secret x is defined as two values $x_A$ and $x_B$, owned by their respective parties, such that $x_A+x_B\equiv \text{mod } n$; 3) hereinafter, randomizing an encrypted value x means obtaining one share and providing the encryption of the other (through homomorphic addition).

C. Definitions of Protocols and Constructions According to One Embodiment.

According to one embodiment of the cryptosystem 102, and without limitation, the protocols are based on two parties, $\mathcal{A}$ and $\mathcal{B}$, both using an additively homomorphic cryptosystem in an asymmetric scenario, where $\mathcal{A}$ can only encrypt, but $\mathcal{B}$ also possesses the decryption key, and can perform both encryption and decryption. For the problem of solving an SLE A·x=b, the system requires that $\mathcal{A}$ owns an encrypted version of the system matrix [[A]], and of the independent vector [[b]].

According to one embodiment, and without limitation, the SLE may have A being either a positive definite matrix or a strictly diagonally dominant matrix. In this particular case, it can be guaranteed both a solution to the system and the convergence of the studied methods, as detailed later.

Regarding the privacy requirements, according to one embodiment the cryptosystem 102 is especially adapted for semi-honest parties, in the sense that they adhere to the established protocol, but they can be curious about the information they can get from the interaction. In this embodiment, the protocols can be proven private; informally, both parties $\mathcal{A}$ and $\mathcal{B}$ can only get the information leaked from the solution to the system, and no information is leaked from the intermediate steps of the protocols.

D. Secure Computational Engine and Method for Multiplying Matrices in the Encrypted Domain.

In order to multiply two encrypted matrices, as there is no multiplication operation in an additively homomorphic cryptosystem, it is necessary to execute an interactive protocol in order to perform each product. According to one embodiment, the systems uses the following method for non-threshold encryption.

According to one embodiment of the secure protocol, and without limitation, it is assumed that there exists an additively homomorphic cryptosystem with plaintext in $\mathbb{Z}_n$ such that $\mathcal{B}$ can decrypt and both $\mathcal{A}$ and $\mathcal{B}$ can encrypt. In this embodiment, $\mathcal{A}$ owns two encrypted scalars $[[x_1]]$ and $[[x_2]]$ and wants to multiply them under encryption. In order to do that, according to one embodiment $\mathcal{A}$ generates two random values $r_1, r_2 \in \mathbb{Z}_n$, and uses them to blind both numbers, using homomorphic modulo-n sum obtaining $[[z_1]]=[[x_1]]+r_1$ mod n, and $[[z_2]]=[[x_2]]+r_2$ mod n, and sends them to $\mathcal{B}$.

According to one embodiment of the method, due to his decryption capabilities, $\mathcal{B}$ can obtain $z_1$ and $z_2$ in the clear, multiply them, and reencrypt the result $[[z_1 \cdot z_2]]$. $\mathcal{B}$ sends this encrypted product to $\mathcal{A}$, who, through homomorphic sums, can obtain the desired result, as $$[[x_1 \cdot x_2]] = [[z_1 \cdot z_2]] - r_1[[x_2]] - r_2[[x_1]] - r_1 r_2.$$

According to the embodiment involving a threshold homomorphic cryptosystem, the procedure is analogous, with the exception that the random values must be generated by both parties.

According to the embodiment involving a product of an L×M matrix and a scalar, the protocol is exactly the same as the scalar-scalar case, with L×M scalar products in parallel.

According to the embodiment involving a matrix-matrix product, all the scalar products are performed using the scalar-scalar product protocol in parallel, with only one randomization per matrix coefficient, and the remaining operations are sums, that can be performed homomorphically. According to one embodiment, in order to minimize the computation and communication complexity, $\mathcal{A}$ may let $\mathcal{B}$ perform all the partial additions that $\mathcal{B}$ can do in the clear and $\mathcal{A}$ would need to do homomorphically.

Neglecting the complexity of the random number generation algorithms, the complexity of the whole protocol, when multiplying an L×M matrix and an M×N matrix is $$\text{Comp}_{cmMULT}(L,M,N) = M \cdot (L+N) + L \cdot N$$

$$\text{Comp}_{cpMULT,\mathcal{A}}(L,M,N) = L \cdot N \cdot M \cdot (3\text{Comp}_{EA} + 2\text{Comp}_{EP})$$

$$\text{Comp}_{cpMULT,\mathcal{B}}(L,M,N) = M \cdot (L+N)\text{Comp}_{Decrypt} + M \cdot L \cdot N \text{Comp}_P + L \cdot N \cdot ((M-1)\text{Comp}_A + \text{Comp}_{Encrypt}).$$

E. Secure Computational Engine and Method for Solving Linear Equations in the Encrypted Domain.

Figure 3:
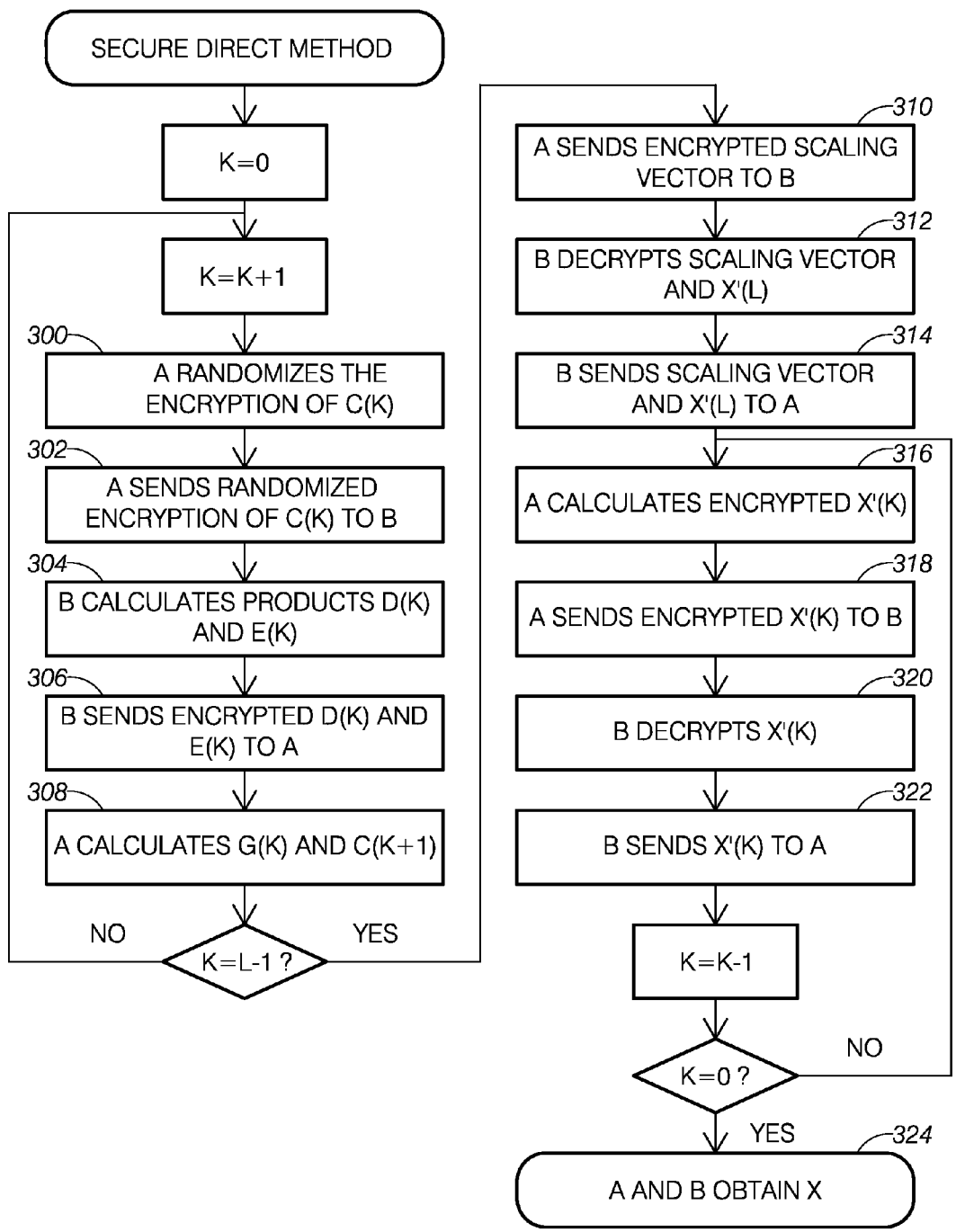
FIG. 3 shows a block diagram to illustrate the secure protocol for solving systems of linear equations in the encrypted domain according to one embodiment.

FIG. 3 shows a block diagram of the direct method for solving systems of linear equations in the encrypted domain according to one embodiment. According to one embodiment, the cryptosystem 102 includes a method for solving systems of linear equations directly on the encrypted data 100 (i.e. without the need to decrypt the data). The method is based on Gaussian elimination, using the secure multiplication protocol for implementing the needed multiplications. Due to the lack of a division operation under encryption, according to one embodiment of the method and cryptosystem 102 the obtained result vector is scaled, but the scale factors are stored in a second vector s, so that the solution can be recovered after decryption through a component-wise division. The protocol ends with two vectors x' and s, being the solution to the system $$x_i = \frac{x'_i}{s_i},$$

$i=1, \ldots, L$.

Below is a detailed description of the methods to implement the secure protocols for solving linear systems of equations according to particular embodiments. Briefly, let L denote the dimension of the system matrix A. For L−1 iterations, being k the number of the iteration ascending from 1 to L−1, according to one embodiment the system repeats the following steps: $\mathcal{A}$ randomizes the encryptions of $[[C^{(k)}]]$ 300; $\mathcal{A}$ sends the randomized encryptions of $[[C^{(k)}]]$ to $\mathcal{B}$ 302; $\mathcal{B}$ calculates the products $[[D^{(k)}]]$ and $[[E^{(k)}]]$, using the received encryptions 304; $\mathcal{B}$ sends the encrypted $[[D^{(k)}]]$ and $[[E^{(k)}]]$ to $\mathcal{A}$ 306; $\mathcal{A}$ calculates $[[G^{(k)}]]$ and $[[C^{(k+1)}]]$, using the received encryptions 308. Then, $\mathcal{A}$ possesses the encrypted scaling vector, and sends it to $\mathcal{B}$ 310. $\mathcal{B}$ decrypts the received scaling vector and the value of $x''_L$ 312. $\mathcal{B}$ sends the decrypted scaling vector and $x'_L$ to $\mathcal{A}$ 314. Then, for L−1 iterations, being k the number of the iteration, descending from L−1 to 1, the following steps are repeated: $\mathcal{A}$ calculates the encrypted $[[x'_k]]$, using the values that $\mathcal{A}$ possesses 316; $\mathcal{A}$ sends the encrypted $[[x'_k]]$ to $\mathcal{B}$ 318; $\mathcal{B}$ decrypts $[[x'_k]]$ 320; $\mathcal{B}$ sends the decrypted $x'_k$ to $\mathcal{A}$ 322. After these operations, $\mathcal{A}$ and $\mathcal{B}$ calculate the solution x to the system of linear equations A·x=b, using the values that they possess 324.

Let $A \in \mathcal{M}_{L \times L}(\mathbb{Z})$ be a quantized symmetric positive-definite matrix, or a diagonally dominant matrix, and $b \in \mathbb{Z}^L$ be a quantized column vector. The quantization step Δ is such that the absolute value of every quantized element is upper bounded by a constant T.

According to one embodiment, and without limitation, the secure protocol method assumes that $\mathcal{B}$ knows the decryption key of an additive homomorphic cryptosystem, and both $\mathcal{A}$ and $\mathcal{B}$ can produce encryptions using this cryptosystem; $\mathcal{A}$ possesses the encrypted matrix [[A]] and the encrypted vector of independent terms [[b]]. Both parties engage in an interactive protocol in order to obtain the solution x to the linear system A·x=b. According to one embodiment, the protocol is described in detail as follows.

Following the Gaussian elimination algorithm, we call $G^{(0)} = G$ to the concatenation of G=[A|b]. The algorithm is executed in L−1 steps. At each step k, the matrix G is modified to obtain an equivalent system $G^{(k)}$ in which the k-th unknown is not present in the last L−k equations.

For the k-th step of the algorithm, the first k−1 elements of the L−k+1 last rows of $G^{(k-1)}$ are zero; $\mathcal{A}$ owns an encrypted version of the non-zeroed elements of $G^{(k-1)}$. The secure protocol proceeds as follows:

1. $\mathcal{A}$ provides randomized encrypted versions of the submatrix $C^{(k)}$ formed by the last (L−k+2) columns of the last (L−k+1) rows of $G^{(k-1)}$;

2. $\mathcal{B}$, through decryption and reencryption, calculates the (randomized) products of the (L−k)×(L−k+1) matrices $D^{(k)}$ and $E^{(k)}$, defined as $[[d_{j,m}^{(k)}]]=[[c_{1,m+1}^{(k)} \cdot c_{j+1,1}^{(k)}]]$, and $[[e_{i,j}^{(k)}]]=[[c_{1,1}^{(k)} \cdot c_{i+1,j+1}^{(k)}]]$, and sends the randomized encryptions to $\mathcal{A}$.

3. $\mathcal{A}$ derandomizes the received encryptions and, using homomorphic operations, obtains the next iteration of G:

$$[\![G^{(k)}]\!] = \left( \begin{array}{c} \{[\![g_{i,m}^{(k-1)}]\!]\}_{(1,1)}^{(k,L+1)} \\ \hline 0_{L-k,k} \mid [\![F^{(k)}]\!] \end{array} \right),$$

where $[\![F^{(k)}]\!]$ is an $(L-k) \times (L-k+1)$ matrix with elements $[\![f_{i,m}^{(k)}]\!] = [\![e_{i,m}^{(k)}]\!] - [\![d_{i,m}^{(k)}]\!]$.

After $L-1$ iterations, $\mathcal{A}$ has an encrypted upper triangular matrix appended to an encrypted vector, $[\![G^{(L-1)}]\!]$, that constitute a system with the same solution as the original one.

According to one embodiment, in order to solve the system of linear equations, both parties initiate the process of back substitution under encryption, consisting of L iterations: in each iteration, an element of the vector x' and the corresponding element of the scale vector s are obtained. As they are revealed at the output, and they are needed in order to calculate the subsequent elements of x', they can be decrypted before the next iteration in order to lower the complexity by reducing the number of the needed multiplication protocols. For the first step:
1. $\mathcal{A}$ sends $\{[\![g_{L,i}^{(L-1)}]\!]\}_{i=1}^{L}$ and $[\![g_{L,L+1}^{(L-1)}]\!]$.
2. $\mathcal{B}$ obtains, through decryption, the scaling vector s, with $s_i = \Pi_{l=i}^{(L)} g_{l,l}^{(L-1)}$, and the value $x'_L = g_{L,L+1}^{(L-1)}$, and sends them back to $\mathcal{A}$.

In each subsequent k-th step, $\mathcal{A}$ calculates, using homomorphic operations:

$$[\![x'_{L-k+1}]\!] = [\![g_{L-k+1,L+1}^{(L-1)}]\!] \cdot s_{L-k+2} - \sum_{l=L-k+2}^{L} [\![g_{L-k+1,l}^{(L-1)}]\!] \cdot x'_l \frac{s_l}{s_{L-k+2}},$$

and sends $[\![x'_{L-k+1}]\!]$ to $\mathcal{B}$ to obtain its decryption.

With this embodiment of the protocol, the system does not disclose any element of the original matrix A nor of the independent terms vector b. Furthermore, every step of the protocol can be proven secure with semi-honest parties, due to the semantical security of the underlying homomorphic cryptosystem, the security of the used multiplication protocols, and the fact that all the unencrypted values (besides the result and the scaling vector) that each party can access are random and uncorrelated. Nevertheless, the scaling vector reveals the diagonal of the upper triangular matrix of an equivalent system, which gives information about the eigenvalues of the original matrix. This information affects L scaled elements out of $$\frac{L(L+1)}{2}.$$

It must be noted that having the values of the principal diagonal of the upper-triangular matrix of the equivalent system yields the possibility of calculating its condition number, or at least, its bound $$\kappa(U) \geq \frac{\max_i (|u_{ii}|)}{\min_i (|u_{ii}|)}.$$

Thus, this disclosed embodiment constitutes a clear advantage in terms of conditioning and efficiency: before executing the back substitution protocol, the rows of $G^{(L)}$ can be multiplied by appropriate factors in order to lower the condition number and minimize error propagation due to working with a fixed point precision. Also, the vector of multiplicative factors $s_i$ can be adequately quantized in the clear to achieve this same goal.

The disclosed embodiment of the protocol does not limit the number N of SLEs sharing the same system matrix A and with different independent term vectors $b_i$ that can be solved in parallel; all the vectors $b_i$ can be appended to the system matrix, forming a $L \times (L+N)$ matrix $G_{ext}$ and at each step of the previous protocol, the operations that must be performed on the last column of $G^{(k)}$ are replicated for the last N columns of $G_{ext}^{(k)}$.

When solving one system $A \cdot x = b$, the Gaussian Elimination (GE) protocol is performed in $(L-1)$ rounds of communication, with total complexity $$Comp_{cmGE} = (L^3 + L^2 - 2)$$

$$Comp_{cpGE,A} = \frac{1}{3}(L^3 + 3L^2 + 2L - 6)Comp_{Encrypt} + \ldots$$

$$\frac{1}{3}(2L^3 + 3L^2 + L - 6)Comp_{EA}$$

$$Comp_{cpGE,B} = \frac{1}{3}(L^3 + 3L^2 + 2L - 6)Comp_{Decrypt} + \ldots$$

$$\frac{2}{3}(L^3 - L)(Comp_{Encrypt} + Comp_P).$$

The protocol of Back Substitution (BS) is performed in L rounds of communication, with total complexity $$Comp_{cmBS} = 2L \cdot (1 + ct)$$

$$Comp_{cpBS,A} = \frac{1}{2}(L^2 + L - 2)Comp_{EP} + \frac{1}{2}(L^2 - L)Comp_{EA}$$

$$Comp_{cpBS,B} = 2L Comp_{Decrypt}.$$

According to one embodiment the coefficients of the system matrix A are quantized versions of the real-valued coefficients, with a quantization step $\Delta$. Furthermore, the absolute value of the quantized coefficients is bounded by an integer $T > 0$. Then, it is possible to estimate the value of T needed to fit all the performed operations inside a cipher that can represent integers in the range $[0, n)$ without rounding problems.

For the first part of the protocol according to one embodiment (the direct secure Gaussian elimination), each iteration multiplies two numbers that were obtained in the previous iteration and adds them up, so the previous bound gets squared and doubled:

$$|t_1|, |t_2|, |t_3|, |t_4| < T \Longleftrightarrow |t_1 \cdot t_2 - t_3 \cdot t_4| < 2T^2.$$

In this embodiment all the elements of the k-th row of the resulting $G^{(L-1)}$ are bounded by $(2^{2^{k-1}-1})T^{2^k}$, and constitute the representation of their real-valued equivalents, quantized by $\Delta^{2^{k-1}}$. Thus, the cipher must be such that $n > (2^{2^{k-1}-1})T^{2^k}$ in order to fit all the numbers involved in this protocol. This means that the bit size of the modulus of the cipher must grow exponentially with the dimensionality of the system, which results in poor scalability.

For the second part of the protocol according to this embodiment, after the diagonal elements are disclosed, they can be re-quantized in order to make them relative to the lowest scale and lower the bit-size requirements of the cipher; but in the worst case, without re-quantizing the scale factors, the largest number present after running the whole protocol is $2^{2^{L-1}}T^{2^{1+L}-4}$. That also constrains the size of the cipher.

F. Extension to Systems with Complex Elements According to One Embodiment.

The protocol presented in the earlier section does not impose any restrictions on the matrix coefficients. It can be used for both unrestricted real coefficients and complex coefficients. In this section we explain how the protocol can be implemented in the case of complex coefficients.

For convenience, and without loss of generality, a binomial representation is chosen for complex numbers; the encryption of a complex number $[[x]]$ is given by the pair $[[x]] \triangleq ([[\mathcal{R}\{x\}]], [[\mathcal{I}\{x\}]])$, that is, the pair of encryptions of its real and imaginary parts.

According to one embodiment, the complex addition operation can be performed through two real additions; thus, it can be performed homomorphically between two encrypted complex numbers as two homomorphic real additions. Regarding the complex product, when it involves one known factor and one encrypted number, it can also be performed homomorphically as four homomorphic multiplications and two homomorphic additions. When involving two encrypted factors, it is performed through four parallel (real) scalar multiplication protocols and two homomorphic additions.

Thus, the matrix multiplication protocol disclosed in the previous section works on complex numbers by adopting the proposed encrypted complex representation, and by substituting the real additions and products by their corresponding complex operations. As a result, the communication complexity is doubled, the number of performed products is multiplied by four, and the number of performed additions is doubled.

For the secure SLE solving protocol, the needed modifications are essentially the same, being the involved scale factors also complex. We must remark that the hypotheses on the system matrix that were imposed for ensuring the convergence of the algorithms are kept unaltered when dealing with systems with complex coefficients, as they are general hypotheses not restricted to systems with real coefficients.

While particular embodiments have been described, it is understood that, after learning the teachings contained in this disclosure, modifications and generalizations will be apparent to those skilled in the art without departing from the spirit of the disclosed embodiments. It is noted that the foregoing examples have been provided merely for the purpose of explanation and are in no way to be construed as limiting. While the system has been described with reference to various embodiments, it is understood that the words which have been used herein are words of description and illustration, rather than words of limitations. Further, although the system has been described herein with reference to particular means, materials and embodiments, the actual embodiments are not intended to be limited to the particulars disclosed herein; rather, the system extends to all functionally equivalent structures, methods and uses, such as are within the scope of the appended claims. Those skilled in the art, having the benefit of the teachings of this specification, may effect numerous modifications thereto and changes may be made without departing from the scope and spirit of the disclosed embodiments in its aspects.

The invention claimed is:

1. A cryptographic system including at least one hardware device having at least one processor or in at least one integrated circuit, said cryptographic system comprising:
    (a) at least one secure protocol for performing matrix multiplications in an encrypted domain; and
    (b) at least one secure protocol for solving systems of linear equations in the encrypted domain without imposing restrictions on one or more matrix coefficients, said secure protocol for solving systems of linear equations in the encrypted domain implemented using a direct method of Gaussian elimination using said secure protocol for performing matrix multiplication in the encrypted domain;
    whereby said cryptographic system performs secure computations, signal processing, and data analysis directly on encrypted data in untrusted environments without the need to decrypt said encrypted data.

2. The cryptographic system of claim 1, wherein said secure protocol for solving systems of linear equations in the encrypted domain is based on privacy-preserving protocols based on homomorphic computation.

3. The cryptographic system of claim 2, wherein said secure protocol for solving systems of linear equations in the encrypted domain is based on privacy-preserving protocols based on homomorphic computation and secret sharing.

4. The cryptographic system of claim 3, wherein said direct method of Gaussian elimination is further performed by:
    (a) means for randomizing a set of input encryptions and calculating a set of encrypted matrices and a scaling vector based on homomorphic computation;
    (b) means for decrypting said scaling vector; and
    (c) means for calculating a set of encrypted elements of an output vector based on homomorphic computation, and decrypting elements of said output vector.

5. The cryptographic system according to claim 4, embodied on a non-transitory storage medium.

\* \* \* \* \*